(12) United States Patent
Mandal et al.

(10) Patent No.: US 11,288,540 B2
(45) Date of Patent: Mar. 29, 2022

(54) INTEGRATED CLUSTERING AND OUTLIER DETECTION USING OPTIMIZATION SOLVER MACHINE

(71) Applicant: FUJITSU LIMITED, Kawasaki (JP)

(72) Inventors: Avradip Mandal, San Jose, CA (US); Hayato Ushijima, San Jose, CA (US); Eldan Cohen, Toronto (CA)

(73) Assignee: FUJITSU LIMITED, Kawasaki (JP)

( * ) Notice: Subject to any disclaimer, the term of this patent is extended or adjusted under 35 U.S.C. 154(b) by 221 days.

(21) Appl. No.: 16/836,843

(22) Filed: Mar. 31, 2020

(65) Prior Publication Data
US 2021/0303915 A1   Sep. 30, 2021

(51) Int. Cl.
*G06K 9/00* (2006.01)
*G06K 9/62* (2022.01)
*G06F 9/30* (2018.01)

(52) U.S. Cl.
CPC ....... *G06K 9/6221* (2013.01); *G06F 9/30036* (2013.01); *G06K 9/6227* (2013.01)

(58) Field of Classification Search
CPC .. G06K 9/6221; G06K 9/6227; G06K 9/6217; G06K 9/00718; G06K 9/03; G06K 9/38; G06K 9/00797; G06K 9/40; G06K 9/00228; G06K 9/62; G06K 9/30; G06F 17/3072; G06F 17/30257; G06F 17/3024; G06T 5/001; G06T 5/20; G06T 5/50;
(Continued)

(56) References Cited

U.S. PATENT DOCUMENTS 6,735,550 B1 * 5/2004 Weekley .............. G06K 9/6217
                                                702/182
7,460,940 B2 * 12/2008 Larsson ................. G06F 3/012
                                                701/49
(Continued)

OTHER PUBLICATIONS

Eldan Cohen et al., "Ising-based Consensus Clustering on Specialized Hardware", arxiv.org, Cornell University Library, Ithaca, NY Mar. 4, 2020 (Mar. 4, 2020), pp. 1-13. (as cited in EESR).
(Continued)

*Primary Examiner* — Amir Alavi
(74) *Attorney, Agent, or Firm* — Fujitsu Patent Center

(57) ABSTRACT

According to an aspect of an embodiment, operations include receiving a set of datapoints for integrated clustering and outlier detection. The operations further include receiving, as a first input, a clustering constraint comprising a number of outlier datapoints to be detected from the set of datapoints and a second input including a distance metric. The operations further include formulating an objective function based on the first and second inputs and transforming the objective function into an unconstrained binary optimization formulation. The operations further include providing such formulation as input to an optimization solver machine and generating a clustering result and an outlier detection result based on output of the optimization solver machine for the input. The clustering result includes a set of datapoint clusters, and the outlier detection result includes a set of outlier datapoints. The clustering result and the outlier detection result are published on a publisher system.

20 Claims, 6 Drawing Sheets

(58) Field of Classification Search
CPC ....... G06T 5/006; G06T 11/60; G06T 11/001; H04N 5/21; H04N 1/40062
See application file for complete search history.

(56) References Cited

U.S. PATENT DOCUMENTS

| | | | | |
|---|---|---|---|---|
| 7,693,810 | B2* | 4/2010 | Donoho | G06Q 40/00 706/48 |
| 8,103,082 | B2* | 1/2012 | Olson | G02B 21/365 382/133 |
| 8,416,332 | B2* | 4/2013 | Sato | H04N 21/4394 348/333.05 |
| 8,478,534 | B2* | 7/2013 | Zhu | H01J 49/0036 702/19 |
| 8,675,985 | B2* | 3/2014 | Song | G06T 5/006 382/275 |
| 8,918,288 | B2* | 12/2014 | Chok | E21B 47/12 702/12 |
| 9,311,899 | B2* | 4/2016 | Kandogan | G06K 9/6221 |
| 9,984,283 | B2* | 5/2018 | Davatzikos | G06T 7/0012 |
| 2006/0294095 | A1* | 12/2006 | Berk | G06Q 30/02 |
| 2021/0303915 | A1* | 9/2021 | Mandal | G06F 9/30036 |

OTHER PUBLICATIONS

Hongfu Liu et al., "Clustering with Outlier Removal", arxiv.org, Cornell University Library, Ithaca, NY Sep. 2, 2019 (Sep. 2, 2020), pp. 1-11.

Weiren Yu et al., "Knowledge Reused Outlier Detection", IEEE Access, vol. 7,Mar. 21, 2019 (Mar. 21, 2019), pp. 43763-43772.

Yinghua Zhou et al., "A Novel k-means Algorithim for Clustering and Outlier Detection", 2009 Second International Future Information Technology and Management Engineering, (FITME '09), pp. 476-480.

Communication and Extended European Search Report (EESR),dated by European Patent Office on Mar. 10, 2021 (Mar. 10, 2021) in connection with European Patent Application No. 20195980.6-1207, 10 pages total.

Bauckhage, Christian, et al. "Adiabatic Quantum Computing for Binary Clustering." arxiv. 1706.05528. (2017).

Kumar, V., et al. "Quantum annealing for combinatorial clustering." Quantum Inf Process 17, 39 (2018). https://doi.org/10.1007/s11128-017-1809-2.

Ott, Lionel, et al. "On Integrated Clustering and Outlier Detection." NIPS (2014).

Sanjay Chawla and Aristides Gionis, "k-means-: A unified approach to clustering and outlier detection." Proceedings of the 2013 SIAM International Conference on Data Mining. 2013, 189-197.

* cited by examiner

INTEGRATED CLUSTERING AND OUTLIER DETECTION USING OPTIMIZATION SOLVER MACHINE

FIELD

The embodiments discussed in the present disclosure are related to integrated clustering and outlier detection accelerated by using special-purpose optimization solver machines capable of solving combinatorial optimization problems.

BACKGROUND

Clustering is a key technique in data mining and includes a task of dividing a population or datapoints into a number of clusters based on similarities among the datapoints. Datapoints in one cluster are similar to datapoints in the same cluster and dissimilar to datapoints in other clusters. Typically, a clustering technique tends to be sensitive to outliers, which are datapoints that do not conform to an expected behaviour/clustering pattern as compared to datapoints in the clusters.

Clustering and outlier detection have many applications in the field of data mining, such as in surveillance, intrusion detection in cyber security, fraud detection for credit cards, insurance or health care, and fault detection in safety critical systems.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of the disclosure, operations may include receiving a set of datapoints for an integrated clustering and outlier detection and receiving a first user input that may indicate a number of outlier datapoints to be detected from the received set of datapoints. The operations may further include receiving a second input that may include a clustering constraint and formulating an objective function for the integrated clustering and outlier detection based on the received first input and the second input. The operations may further include transforming the formulated objective function into an unconstrained binary optimization formulation (such as Quadratic Unconstrained Binary Optimization (QUBO) and providing the unconstrained binary optimization formulation as an input to an optimization solver machine. The operations may further include generating a clustering result and an outlier detection result as an output of the optimization solver machine. The clustering result may include a plurality of datapoint clusters, and the outlier detection result may include a set of outlier datapoints. The operations may further include publishing the clustering result and the outlier detection result on a publisher system, such as on a user interface (UI) of a user device or on a database server.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
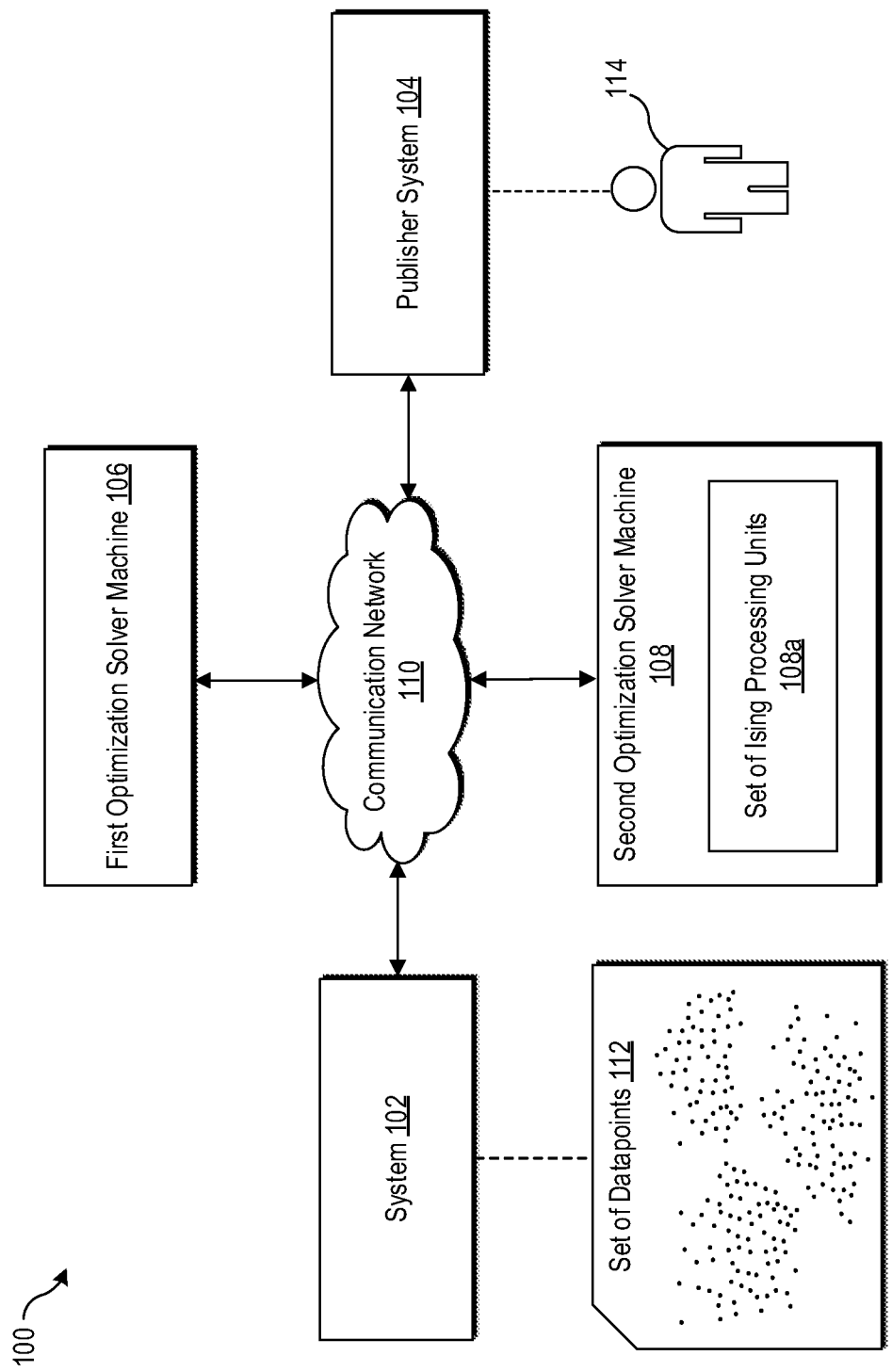
FIG. 1 is a diagram representing an example environment related to integrating clustering and outlier detection using an optimization solver machine.

Some embodiments described in the present disclosure relate to methods and systems for accelerated solving of combinatorial optimization problems. Many of the real-world problems can be treated as a combinatorial optimization problem. For example, a real-world problem for a fraud detection from multiple credit card transactions may be considered as a combinatorial optimization problem, especially when the number of transactions on the credit card is huge. Any particular combinatorial optimization problem will usually have a specific set of optimal solutions that have to be searched from a discrete solution space. The time and computational complexity for estimation of optimal solutions increases as the size of a combinatorial optimization problem increases. Most of the combinatorial optimization problems can be classified as a non-deterministic polynomial-time (NP) optimization problem, which may be computationally intractable (as the number of input parameters increases) for conventional computers.

As the number of datapoints increases, the computation time of conventional computers to provide an optimal or near optimal solution for clustering and outlier detection increases. For a sufficiently large dataset of datapoints, it may become computationally intractable for conventional computers to produce an optimal or near optimal solution in a short span of time.

Clustering can be defined as the task of dividing a population or datapoints into a number of clusters such that datapoints in one cluster are similar to other datapoints in the same cluster and dissimilar to datapoints in other clusters. In other words, the aim of clustering is to search for datapoints that show similar traits and assign such datapoints to a common cluster. During clustering, some of the datapoints may be left out and may not be a part of any cluster. These datapoints are referred as outliers, which may be datapoints that do not conform to an expected behaviour/clustering pattern as compared to the datapoints in the clusters. Outlier detection is a technique which is used to identify unusual datapoints that do not conform to an expected behavior/clustering pattern. Clustering and outlier detection together have many applications in real world. Some of these applications include surveillance, intrusion detection in cyber security, fraud detection for credit cards, insurance or health care and fault detection in safety critical systems and in various kind of images.

Typically, clustering and outlier detection are addressed as two separated problem. However, some studies have shown various advantages of integrating both the clustering and outlier detection. Some of the advantages include:
  (i) Clusters tend to be compact and semantically coherent,
  (ii) Clusters are more robust against data perturbations,
  (iii) Outliers are contextualized by the clusters and are more interpretable.

The problem (i.e. the task) of integrated clustering and outlier detection can be considered as a NP-hard problem, especially when the number of input datapoints increases beyond a threshold number.

Various methods for standalone clustering or clustering in combination with outlier detection are already known in the art. Some of these methods include centroid-based clustering (such as K-means and it's progeny and Facility Location with Outliers (FLO)), density-based clustering (such as Density-based spatial clustering of applications with noise (DBSCAN), Ordering points to identify the clustering structure (OPTICS), and Mean-shift), distribution-based clustering (such as Distribution-Based Clustering of Large Spatial Databases (DBCLASD), and Gaussian Mixture Models Clustering (GMM)), Hierarchical Clustering (such as Balanced Iterative Reducing and Clustering using Hierarchies (BIRCH), Clustering Using Representatives (CURE), Robust Clustering using Links (ROCK), and Chameleon), Fuzzy Theory-based Clustering (such as Fuzzy c-means (FCM), Fuzzy Compactness and Separation (FCS), Mini-Model Clustering (MM)), etc. However, in most of the methods, the time complexity is non-linear, and the search space increases rapidly with an increase in the number of input datapoints.

According to one or more embodiments of the present disclosure, the technological field of discrete optimization may be improved by configuring a system in a manner in which the system is able to solve an integrated clustering and outlier detection problem (an NP problem) in a computationally tractable amount of time. The system may be configured to receive inputs, such as a set of datapoints and a clustering constraint, such as a number of outliers to be detected from the set of datapoints. The system may be further configured to formulate an objective function for the integrated clustering and outlier detection problem based on the inputs and transform the formulated objective function into an unconstrained binary optimization formulation. The system may be further configured to provide the unconstrained binary optimization formulation as an input to an optimization solver machine and generate a clustering result and an outlier detection result based on an output of the optimization solver machine for the input. The clustering result may include a plurality of datapoint clusters, and the outlier detection result may include a set of outlier datapoints.

In the present disclosure, the number of model variables for the unconstraint binary optimization formulation may be represented as N×K, where N is the number of datapoints, and K is the number clusters. As the time-complexity of a clustering method depends on the size/number of input datapoints, the number of model variables may be estimated as hundred million ($10^8$ for a million ($N=10^6$) input datapoints and $K=10^2$ clusters. In contrast, the number of model variables for a conventional clustering method, like FLO may be represented by $N^2+N$, where N is the number of input datapoints. For the same number of input datapoints, (i.e. a million ($N=10^6$)), the number of model variables may reach a trillion ($10^{12}$, i.e. $(10^6)^2+10^6 \approx 10^{12}$). Therefore, for $10^6$ input datapoints, the FLO clustering method produces $10^4$ (i.e. $10^{12}/10^8$) times more model variables as compared to the method of the present disclosure. As a result, the present disclosure helps to reduce the time-complexity for searching for an optimal (or near optimal) solution of the clustering and outlier detection problem from a finite solution space. Additionally, optimization solver machines are typically optimized to run meta-heuristics (such as Quantum Annealing) or other search methods to find optimal or near optimal solutions. As the present disclosure relies on such optimization solver machines, the search for the optimal or near optimal solution for the integrated clustering and outlier detection problem may be completed in a computationally tractable amount of time as compared to conventional solutions (such as the FLO method).

Embodiments of the present disclosure are explained with reference to the accompanying drawings.

FIG. 1 is a diagram representing an example environment related to integrating clustering and outlier detection using an optimization solver machine, arranged in accordance with at least one embodiment described in the present disclosure. With reference to FIG. 1, there is shown an environment 100. The environment 100 includes a system 102, a publisher system 104, a first optimization solver machine 106. Additionally, the environment 100 includes a second optimization solver machine 108, which may include a set of Ising processing units 108a.

The system 102, the publisher system 104, the first optimization solver machine 106, and the second optimization solver machine 108 may be communicatively coupled to each other, via a communication network 110. In FIG. 1, there is further shown a user 114 who may be associated with the publisher system 104. Examples of the publisher system 104 may include, but are not limited to, a mobile device, a desktop computer, a laptop, a computer work-station, a server, such as a cloud server or a group of servers. In one or more embodiments, the publisher system 104 may include a user-end terminal device and a server communicatively coupled to the user-end terminal device. Examples of the user-end terminal device may include, but are not limited to, a mobile device, a desktop computer, a laptop, and a computer work-station.

The system 102 may include suitable logic, circuitry, and interfaces that may be configured to receive a set of datapoints 112 for an integrated clustering and outlier detection task from the user 114 via the publisher system 104. The set of datapoints 112 may include datapoints from which datapoint clusters may be generated and outliers may be detected. Examples of the set of datapoints 112 may include, but are not limited to, credit card transactions, image datapoints, video scene information, or market research data.

The system 102 may further receive, as a first input, a first clustering constraint which may include a number of outlier datapoints to be detected from the received set of datapoints 112. In an embodiment, the received first input may specify an upper bound for outlier datapoints on a number of outlier datapoints to be detected from the received set of datapoints 112. In another embodiment, the received first input may specify a lower bound on a number of outlier datapoints to be detected from the received set of datapoints 112. The system 102 may further receive a second input comprising a distance metric to be used to formulate an objective function for the integrated clustering and outlier detection.

The distance metric may be one of Euclidean distance, L1 norm, Minkowski distance, Manhattan distance, L2 norm, or cosine distance.

In at least one embodiment, the system 102 may further receive, as a third input, a second clustering constraint which may include a maximum number of datapoint clusters to be included in a clustering result obtained using the received set of datapoints 112.

In one embodiment, the first input, the second input, and the third input may be received as user inputs via the publisher system 104. Alternatively, the first input, the second input, and the third input may be retrieved from a database on the publisher system 104, through one or more Application Programming Interface (API) calls to the database. The database may be configured to maintain parameter information/inputs for multiple clustering and outlier detection tasks. By way of example, the database may be of an e-commerce website which stores click-stream and customer footprints data as a set of datapoints. For clustering consumer preferences into a set number of product categories (i.e. number of datapoint clusters), the database may be configured to specify a number of datapoints (such as users/user's datapoints) which should be detected as outliers and a number of datapoint clusters (i.e. product categories into which users/user's datapoints may be clustered). In such an implementation, there may not be a need for the user 114 to manually input all the constraints/datapoints. Instead, the system 102 may automatically retrieve such information from the database through API calls.

The system 102 may formulate an objective function as a mathematical formulation for the integrated clustering and outlier detection problem based on the received first input and the second input. In one embodiment, the objective function may be formulated further based on the third input. For example, for a given set of datapoints, the objective function may be formulated to find a partition of the given set of datapoints into a particular number of clusters with a number of outliers such that a within cluster sum of dissimilarities (WCSD) is a minimum. An example of the objective function is provided in FIGS. 3A-B, for example.

In order to solve the integrated clustering and outlier detection problem on a suitable optimization solver machine, the formulated objective function may need to be converted into a compatible input formulation, such as an unconstrained binary optimization formulation or an Ising formulation. For the first optimization solver machine 106, the system 102 may transform the formulated objective function into the unconstrained binary optimization formulation, such as a Quadratic Unconstrained Binary Optimization (QUBO) formulation. The unconstrained binary optimization formulation may include a relationship between a vector of binary decision variables and a square matrix corresponding to the formulated objective function. Each of the received set of datapoints 112 may be encoded as a binary decision variable in the vector of binary decision variables. The transformation of the objective function to the unconstrained binary optimization formulation is further described, for example, in FIGS. 3A-B.

In one or more embodiments, the system 102 may provide a call (e.g., an API call) to the first optimization solver machine 106 to generate a first output (solution) for the integrated clustering and outlier detection problem. In order to generate the first output, the unconstrained binary optimization formulation may be provided as a first input to the first optimization solver machine 106.

The first optimization solver machine 106 may receive the call and may produce the first output for the integrated clustering and outlier detection by solving the unconstrained binary optimization formulation (such as the QUBO formulation). As an example, the first optimization solver machine 106 may apply quantum annealing (i.e. a meta-heuristic method) to search for binary values of the vector of binary decision variables of the unconstrained binary optimization formulation from within a discrete solution space for the integrated clustering and outlier detection problem. The binary values of the vector of binary decision variables may be included in the first output of the first optimization solver machine 106.

Based on the first output of the first optimization solver machine 106 for the first input, the system 102 may generate a first clustering result and a first outlier detection result. The first clustering result may include a plurality of datapoint clusters and the first outlier detection result may be include a set of outlier datapoints. While each datapoint cluster may include a subset of datapoints of the received set of datapoints 112, each outlier datapoint may correspond to a datapoint in the received set of datapoints 112 that may be excluded from the first clustering result.

In one or more embodiments, the generated first clustering result and the first outlier detection result may be evaluated to determine whether such results satisfy a set of validity constraints. These constraints may be used to check whether every datapoint in the received set of datapoints belongs to (or is mapped to) at most one datapoint cluster in the first clustering result and/or whether the number of outlier datapoints in the first outlier detection result equals the number of outlier datapoints that may be specified as the first input at the time of composing the clustering and outlier detection problem. In cases where the set of validity constraints is not satisfied, the QUBO formulation may be again generated with updated values of penalty terms. Further details on the validity constraints check are provided, for example, in FIGS. 3 and 4.

In case the validity constraints are satisfied by the generated first clustering result and the first outlier detection result, the system 102 may publish the generated first clustering result and first outlier detection result on the publisher system 104. For example, the generated clustering result and the first outlier detection result may be published as a graph on a Graphical User Interface (GUI) of a user-end terminal of the publisher system 104. On the graph, datapoints of each datapoint cluster may be plotted along with the outlier datapoints. Suitable visual markers (such as color codes) may be used to differentiate between datapoints belonging to the plurality of datapoints clusters and the outlier datapoints. Through the graph, an end-user (such as the user 114) of the user-end terminal may able to visualize the results of the first optimization solver machine 106 and obtain relevant insights associated with the set of datapoints 112.

The first optimization solver machine 106 may be a computing system that may be configured to execute program instructions associated with one or more searching methods and/or meta-heuristic methods, such as quantum annealing. In an embodiment of the disclosure, the first optimization solver machine 106 may be implemented on a server, such as a cloud server or a hybrid cloud, where inputs to the server may be received via an API request from the system 102.

In one or more embodiments of the disclosure, the first optimization solver machine 106 may be a generalized quantum computing device. In such an implementation, the generalized quantum computing device may use a specialized optimization solving software application, such as a QUBO solver, at application layer to implement a searching method or a meta-heuristic method, such as simulated annealing or quantum annealing, on a formulation (such as QUBO) of the integrated clustering and outlier detection problem. The generalized quantum computing device may be different from a digital bit-based computing device, such as a digital device that may be based on transistor-based digital circuits. The generalized quantum computing device may include one or more quantum gates that use quantum bits (hereinafter, referred to as "qubits") to perform computations for different information processing applications, such as quantum annealing computations for solving combinatorial optimization problems.

In general, a qubit can represent "0", "1", or a superposition of both "0" and "1". In most cases, the generalized quantum computing device may need a carefully controlled cryogenic environment to function properly. The generalized quantum computing device may use certain properties found in quantum mechanical systems, such as quantum fluctuations, quantum superposition of its Eigen-states, quantum tunneling, and quantum entanglement. These properties may help the generalized quantum computing device to perform computations for solving certain mathematical problems (e.g. in the form of QUBO formulations). Examples of the generalized quantum computing device may include, but are not limited to, a silicon-based nuclear spin quantum computer, a trapped ion quantum computer, a cavity quantum-electrodynamics (QED) computer, a quantum computer based on nuclear spins, a quantum computer based on electron spins in quantum dots, a superconducting quantum computer that uses superconducting loops and Josephson junctions, or a nuclear magnetic resonance quantum computer.

In some other embodiments, the first optimization solver machine 106 may be a quantum annealing computer that may be specifically designed and hardware/software optimized to implement searching methods or meta-heuristic methods, such as simulated annealing or quantum annealing. The quantum annealing computer may also use a solver (i.e. a software application on its application layer), such as a QUBO solver to compute solutions of a QUBO formulation of the integrated clustering and outlier detection problem. Similar to the generalized quantum computing device, the quantum annealing computer may also use qubits and may require a carefully controlled cryogenic environment to function properly.

In some other embodiments, the first optimization solver machine 106 may correspond to a digital quantum-computing processor for solving the specific optimization problem. More specifically, the first optimization solver machine 106 may be a digital annealer that may be based on a semiconductor-based architecture and may be able to solve QUBO formulations using a QUBO solver. The digital annealer may be designed to model the functionality of the quantum annealing computer on a digital circuitry (such as a Complementary Metal-Oxide-Semiconductor (CMOS) annealer circuitry). The digital annealer may operate at room temperature and may not require cryogenic environment to function. Also, the digital annealer may have a specific form factor that may allow it to fit on a circuit board that is small enough to slide into the rack of a computing device or a computing infrastructure, such as a data center.

In some embodiments, the first optimization solver machine 106 may further include a processor that may be configured to execute software instructions associated with one or more searching methods and/or meta-heuristic methods, such as simulated annealing or quantum annealing. The processor may be a Reduced Instruction Set Computing (RISC) processor, an Application-Specific Integrated Circuit (ASIC) processor, a Complex Instruction Set Computing (CISC) processor, a Graphical Processing Unit (GPU), a Central Processing Unit (CPU), a co-processor, and/or a combination thereof.

In one or more embodiments, the system 102 may utilize the second optimization solver machine 108 for solving the integrated clustering and outlier detection problem. For the second optimization solver machine 108, the system 102 may transform the unconstrained binary optimization formulation into an Ising formulation, which may be a compatible input formulation for the second optimization solver machine 108.

The second optimization solver machine 108 may include the set of Ising processing units 108a that may be configured to solve the Ising formulation(s). In one or more embodiments, each Ising processing unit may be a software module or hard-based device that may be configured to run on the second optimization solver machine 108. Each Ising processing unit may correspond to a mathematical abstraction of an Ising model for solving the Ising formulation, which may be based on the Ising model. The Ising model may be a mathematical model concerned with the physics of phase transitions, which occur when a small change in a parameter causes a large-scale, qualitative change in the state of a system. The properties of a magnetic material may be determined by magnetic spins, which can be oriented up (+1) or down (−1). The Ising model may be expressed in terms of the individual spin states (+1/−1), the interaction coefficients that represent the strength of the intersections between different pairs of spin states, and the external magnetic coefficients that represent the strength of the external magnetic field. Therefore, a solution of the Ising formulation may be analogous to spin states for a minimum energy configuration of the Ising model.

The set of Ising Processing Units 108a may be configured to solve the Ising formulation of the integrated clustering and outlier detection problem by searching for values of binary decision variables (+1/−1) of the Ising formulation from a discrete solution space such that the energy (analogous to energy of the Ising Model) of the Ising formulation is a minimum.

In one or more embodiments, the second optimization solver machine 108 may receive an API call from the system 102 to produce a second output by solving the Ising formulation of the integrated clustering and outlier detection problem. The second optimization solver machine 108 may apply quantum annealing (i.e. a meta-heuristic method) to find a global minimum of the Ising formulation over a discrete solution space. The second output of the second optimization solver machine 108 may include binary values (+1 or −1) of a vector of binary decision variables in the Ising formulation. Each binary decision variable may correspond to an encoding of a datapoint in the received set of datapoints 112.

The second optimization solver machine 108 may be a computing system that may include the set of Ising processing units 108a as a specialized software-based optimization solver or a specialized hardware-based optimization solver. In an embodiment of the disclosure, the second optimization solver machine 108 may be implemented on a server (such as a cloud server or a hybrid cloud), where inputs to the server may be received via an API request from the system 102. Examples of implementations of the second optimization solver machine 108 may include, but are not limited to, a generalized quantum computing device. an Adiabatic Quantum Computer (AQC), a gate-based quantum computer, a CMOS annealer, a neuromorphic computer, a quantum computer based on magnetic spins, a superconducting quantum computer that uses superconducting loops and Josephson junctions, or a nuclear magnetic resonance quantum computer.

In some embodiments, the second optimization solver machine 108 may also include a processor that may be configured to execute software instructions associated with one or more searching methods and/or meta-heuristic methods, such as simulated annealing or quantum annealing. The processor may be a RISC processor, an ASIC processor, a CISC processor, a GPU, a CPU, a co-processor, and/or a combination thereof.

It should be noted that the communication between the system 102, the publisher system 104, the first optimization solver machine 106, and the second optimization solver machine 108 may be performed via the communication network 110. The communication network 110 may include a communication medium through which the system 102 may communicate with the publisher system 104, the first optimization solver machine 106, the second optimization solver machine 108, different servers, or other optimization solvers (not shown). Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

In FIG. 1, the first optimization solver machine 106 and the second optimization solver machine 108 are shown as two separate entities from the system 102. However, in certain exemplary embodiments, the entire functionality of the first optimization solver machine 106 and the second optimization solver machine 108 may be incorporated in the system 102, without deviating from the scope of the disclosure.

Figure 2:
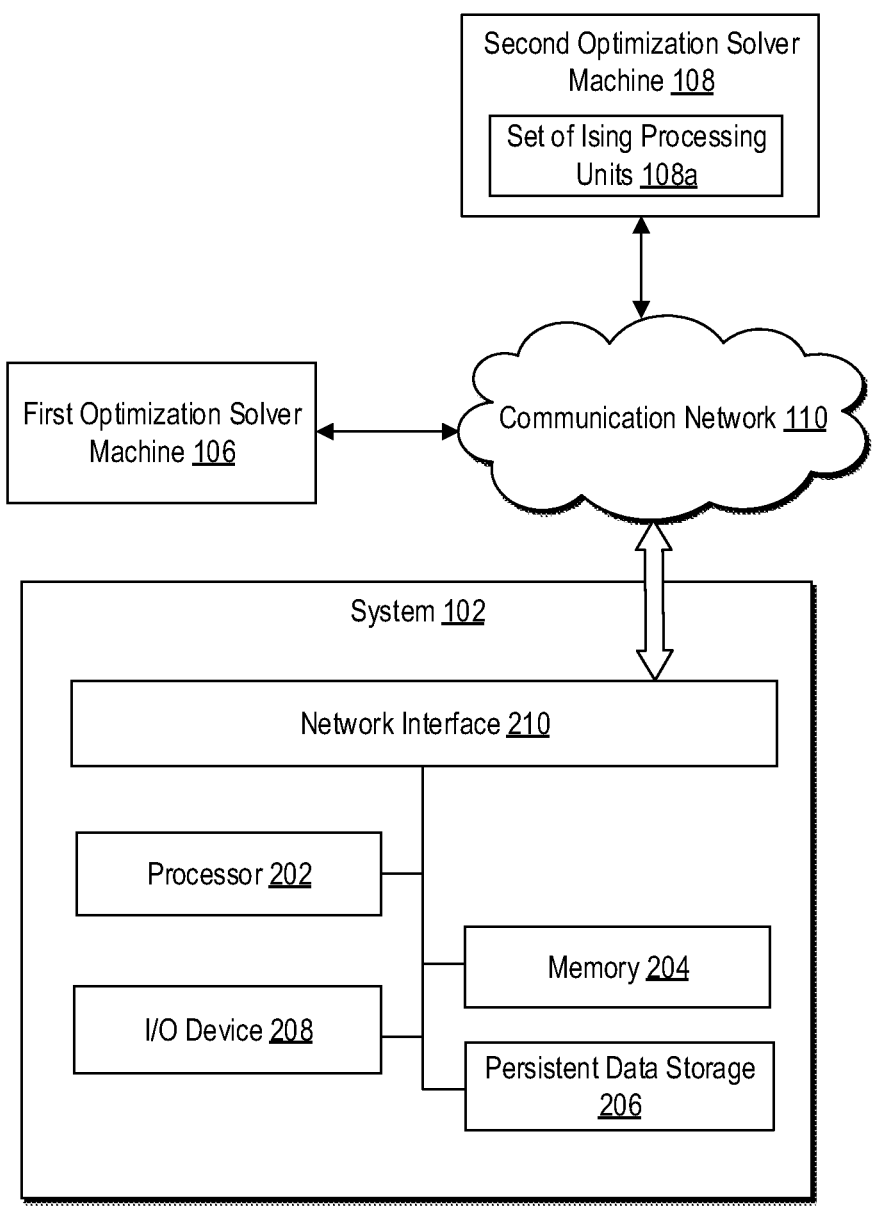
FIG. 2 is a block diagram of a system for integrating clustering and outlier detection.

FIG. 2 is a block diagram of a system for integrating clustering and outlier detection, arranged in accordance with at least one embodiment described in the present disclosure. FIG. 2 is explained in conjunction with elements from FIG. 1. With reference to FIG. 2, there is shown a block diagram 200 of the system 102. The system 102 may include a processor 202, a memory 204, a persistent data storage 206, an input/output (I/O) device 208, and a network interface 210.

In FIG. 2, the block diagram 200 of the system 102 is shown to be communicatively coupled to the first optimization solver machine 106 and the second optimization solver machine 108, via the communication network 110, In such an implementation, each of the first optimization solver machine 106 and the second optimization solver machine 108 may be implemented as a separate entity on a computing infrastructure, such as on a cloud computing server or a hybrid cloud. However, the present disclosure may not be so limiting and in one or more embodiments, each of the first optimization solver machine 106 and the second optimization solver machine 108 may be included in the system 102, without departing from the scope of the disclosure.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure. Additionally, one or more of the processors may be present on one or more different electronic devices, such as different servers.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a GPU, a CPU, a RISC processor, an ASIC processor, a CISC processor, a co-processor, and/or a combination thereof.

The memory 204 may include suitable logic, circuitry, and/or interfaces that may be configured to store program instructions executable by the processor 202. In one or more embodiments, the memory 204 may store mathematical formulations (such as QUBO or Ising formulations) and the set of datapoints 112 from which datapoint clusters may be generated and outliers may be detected. In one or more embodiments, the memory 204 may also store inputs, such as clustering constraints and number of outliers to be detected from the set of datapoints. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. The persistent data storage 206 may include computer-readable storage media for carrying or having computer-executable instructions or data structures stored thereon. Such computer-readable storage media may include any available media that may be accessed by a general-purpose or a special-purpose computer, such as the processor 202.

By way of example, and not limitation, such computer-readable storage media may include tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or a special-purpose computer. Combinations of the above may also be included within the scope of computer-readable storage media. Computer-executable instructions may include, for example, instructions and data configured to cause the processor 202 to perform a certain operation or a group of operations associated with the system 102.

The I/O device 208 may include suitable logic, circuitry, interfaces, and/or code that may be configured to receive a user input. The I/O device 208 may be further configured to provide an output in response to the user input. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display and a speaker.

The network interface 210 may comprise suitable logic, circuitry, interfaces, and/or code that may be configured to establish a communication between the system 102, the publisher system 104, and the first optimization solver machine 106, via the communication network 110. The network interface 210 may be implemented by use of various known technologies to support wired or wireless communication of the system 102 via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the system 102 without departing from the scope of the present disclosure. For example, in some embodiments, the system 102 may include any number of other components that may not be explicitly illustrated or described.

Figure 3A:
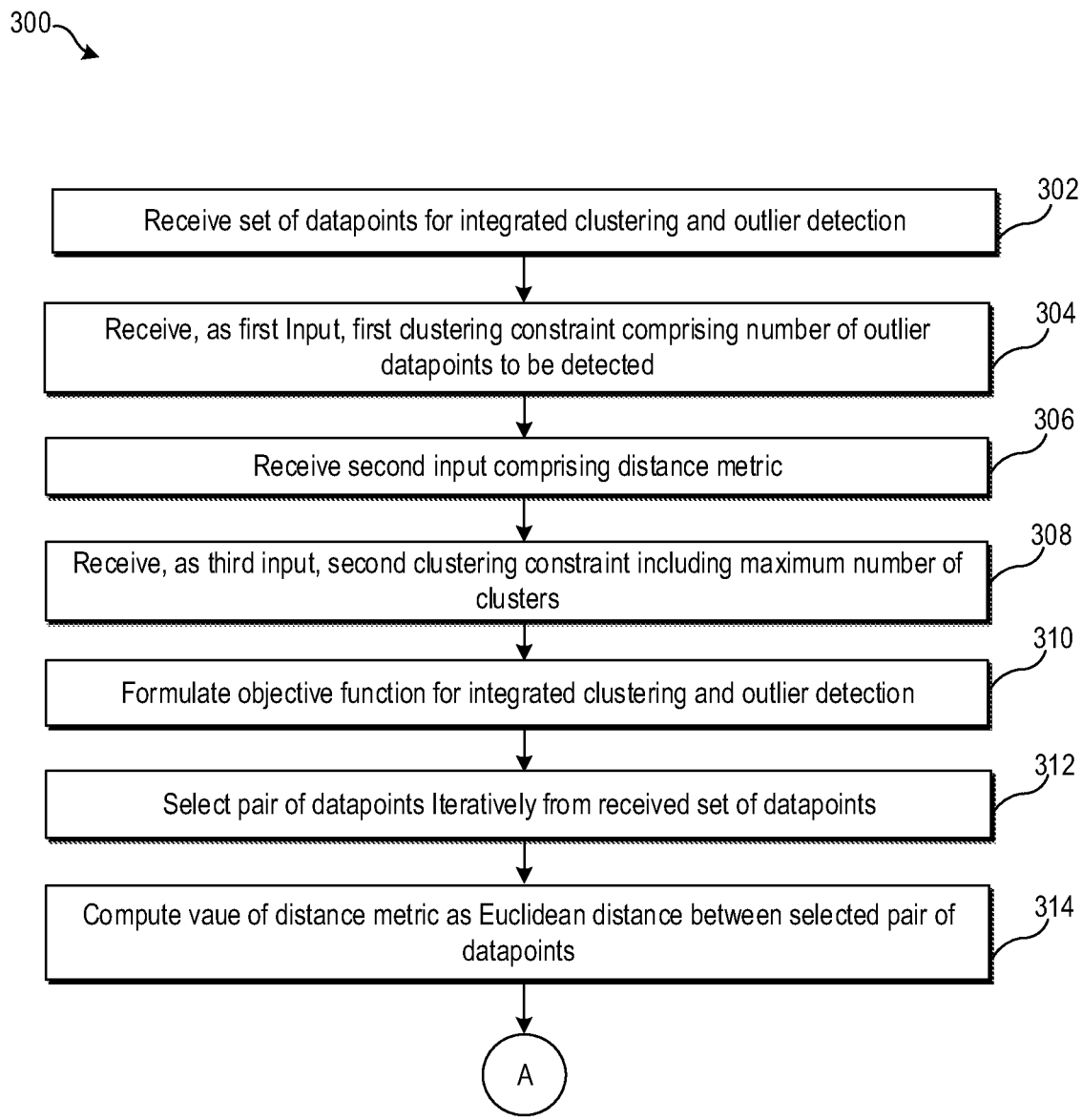
FIGS. 3A-B are flowcharts of an example method of solving an integrated clustering and outlier detection problem using a first optimization solver machine.
Figure 3B:
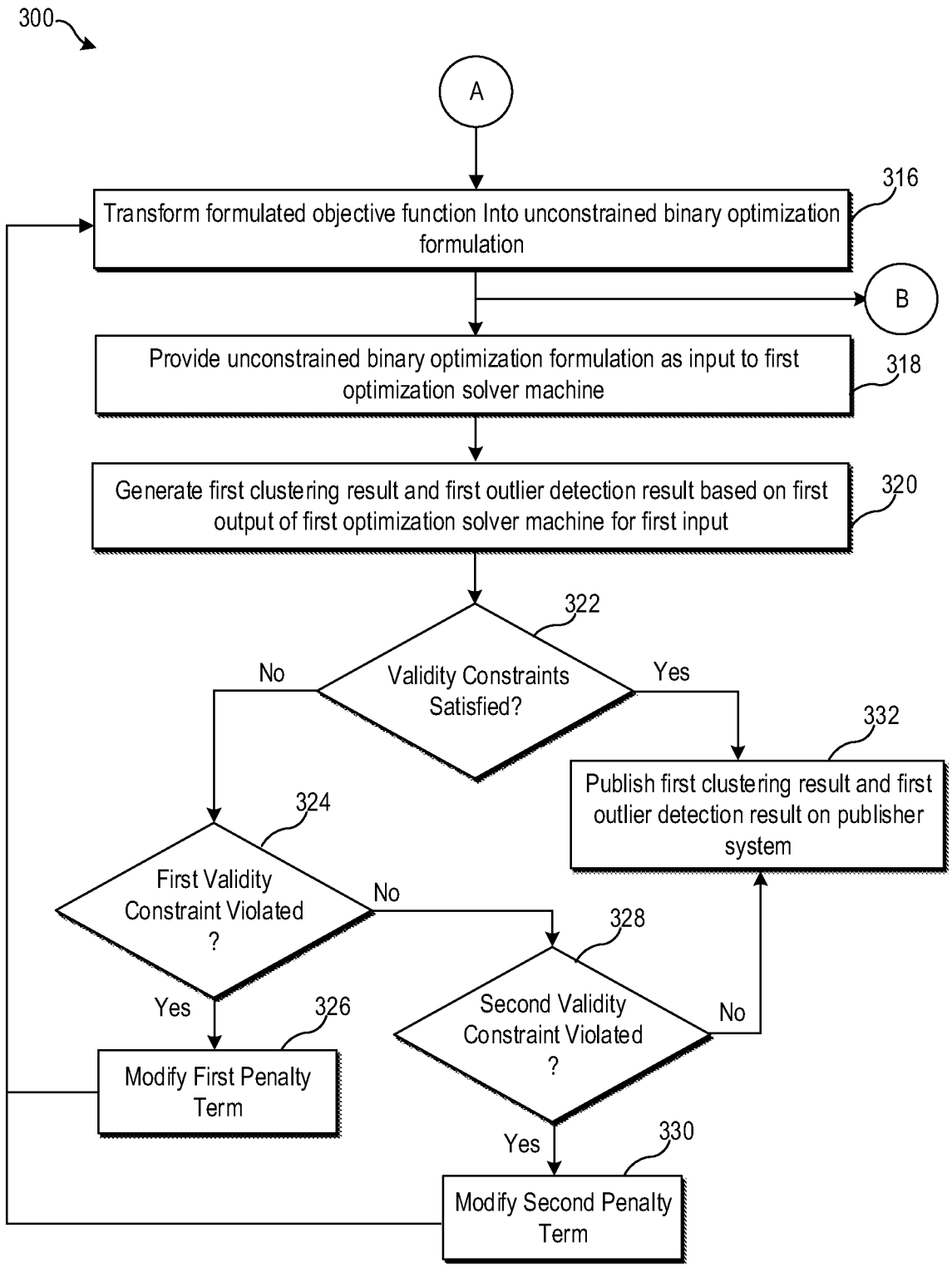

FIGS. 3A-B is a flowchart of an example method of solving an integrated clustering and outlier detection problem using a first optimization solver machine, according to at least one embodiment described in the present disclosure. FIGS. 3A-B are explained in conjunction with elements from FIG. 1 and FIG. 2. With reference to FIGS. 3A-B, there is shown a flowchart 300. The method illustrated in the flowchart 300 may start at 302 and may be performed by any suitable system, apparatus, or device, such as by the system 102 of FIG. 1 or FIG. 2.

At 302, the set of datapoints 112 may be received for an integrated clustering and outlier detection task. In at least one embodiment, the system 102 may receive the set of datapoints 112 from the publisher system 104, via the communication network 110. Each datapoint of the set of datapoints 112 may be a discrete unit of information, which may be represented in the form of two or more-dimensional data. More specifically, the set of datapoints 112 may be bivariate datapoints or multivariate datapoints, such as text, n-dimensional vectors, words (e.g., represented as word vectors), phrases/sentences (represented in sentence vectors, documents, in-image or in-video objects, image datapoints, or 3D points/volumetric datapoints.

As one example, the set of datapoints 112 may be included in a tabular dataset which may include a column for average day temperature of California for past 10 years and a second column for day-wise sales of ice cream (in units) in California on respective days. Each datapoint of the tabular dataset may be a 2-dimensional datapoint which includes the temperature of a day (Tn) and ice cream sales (Sn), where n is row index (or day index). As another example, the set of datapoints 112 may be included in a credit card transaction dataset as 5-dimensional datapoints, each of which may include a credit card number, a last transaction amount, a transaction timestamp, a transaction location, and a total amount of past transactions in last one month.

At 304, a first input may be received for the integrated clustering and outlier detection task. In at least one embodiment, the system 102 may receive, as the first input, a first clustering constraint for the integrated clustering and outlier detection task from the publisher system 104. The first input may include a number of outlier datapoints to be detected from the received set of datapoints 112. In some embodiments, the received first input may represent an upper bound on the number of outlier datapoints to be detected. In some other embodiments, the received first input may represent a lower bound on the number of outlier datapoints to be detected from the received set of datapoints 112. In some other embodiments, the received first input may specify both a lower bound and an upper bound (i.e., a range) on the number of outlier datapoints.

At 306, a second input may be received for the integrated clustering and outlier detection task. In at least one embodiment, the system 102 may receive the second input from the publisher system 104. The second input may include a distance metric to be used to calculate a degree of similarity between all pairs of datapoints. For example, the distance metric may be one of Euclidean distance, L1 norm, Minkowski distance, Manhattan distance, L2 norm, or cosine distance.

At 308, a third input may be received for the integrated clustering and outlier detection task. In at least one embodiment, the system 102 may receive, as the third input, a second clustering constraint which may include a maximum number of datapoint clusters to be included in a clustering result for the integrated clustering and outlier detection task.

At 310, an objective function may be formulated for the integrated clustering and outlier detection task. In at least one embodiment, the system 102 may formulate the objective function for the integrated clustering and outlier detection task. The objective function may be a mathematical formulation of the integrated clustering and outlier detection-based task and may be formulated based on the received set of datapoints (at 302), the received first input (at 304), the received second input (at 306). Additionally, in one or more embodiments, the objective function may be formulated further based on the third input (at 308).

By way of example, and not limitation, the formulated objective functions for the integrated clustering and outlier detection task may be given by equation (1), as follows:

$$\min_S \sum_{k=1}^{K} \sum_{i<j; x_i, x_j \in S_k} d(x_i, x_j) \quad (1)$$

Such that $S = S_1 \cup S_2 \cup S_3 \ldots \cup S_k \cup O$ $|O| = L$ $A \cap B = \emptyset \ \forall \ A, B \in \{S_1, S_2, S_3 \ldots S_k, O\}$ $d(x_i, x_j) = \|x_i - x_j\|^2$ where,
$X = x_1 \ldots x_n$ may be a set of (n) datapoints,
d: $X \times X \rightarrow R$ is a distance function applicable over all pairs of datapoints in X,
$x_i, x_j$ are points in X and represented in a d-dimensional Euclidean space,
$d(x_i, x_j)$ is the Euclidean distance (i.e. the distance metric as the second input at 306),
L=number of outlier datapoints (i.e. the first input at 304),
K=number of datapoint clusters (i.e. the third input at 308), and
$S_k$=disjoint datapoint clusters obtained after partitioning X into K disjoint clusters.

Although, in equation (1), $d(x_i, x_j)$ represents Euclidean distance as the distance metric, however, the Euclidean distance as a distance metric is merely provided as an example of a dissimilarity/distance metric. The present disclosure may also be applicable to other distance metrics, such as, but not limited to, L1 norm, Minkowski distance, Manhattan distance, L2 norm, cosine distance, or Hamming distance. The distance metric may be specified as the second input (at 308) to the integrated clustering and outlier detection problem.

From equation (1), the objective function may be a mathematical formulation to find a partition of X into K disjoint clusters ($S_k$) and a set of L outlier datapoint such that the within cluster sum of dissimilarities (WCSD) is a minimum. For partitioning of X into K disjoint clusters ($S_k$), the objective function may include a first constraint that no two datapoints may be assigned a common cluster (as specified by the constraint $A \cap B = \emptyset$) and a second constraint that a union of the set of disjoint clusters ($S_k$) and the outlier datapoints (O) should be equal to the set of datapoints (X).

At 312, a pair of datapoints may be iteratively selected from the received set of datapoints 112. In at least one embodiment, the processor 202 may iteratively select a pair of points from the received set of datapoints. Each pair of datapoints may be selected at random (or in a pattern) and in such a way that each point is paired with every other datapoint present in the received set of datapoints 112.

At 314, a value of the distance metric may be computed between a first datapoint of the selected pair of datapoints and a second datapoint of the selected pair of datapoints. The distance matric may be received as the second input at 306. In some embodiments, the processor 202 may compute the value of the distance metric as, for example, a Euclidean distance between the first datapoint and the second datapoint. For example, using equation (1), for $x_1$ as the first datapoint and $x_2$ as the second datapoint, the Euclidean distance may be computed as $d(x_i, x_j) = \|x_i - x_j\|^2$. In some other embodiments, the value of the distance metric may be computed as one of a L1 norm, a Minkowski distance, a Manhattan distance, a L2 norm, a cosine distance, or a Hamming distance between the first datapoint and the second datapoint.

At 316, the formulated objective function may be transformed into an unconstrained binary optimization (UBO) formulation. In at least one embodiment, the transformation of the objective function into the unconstrained binary optimization formulation may be based on the computed value of the distance metric (at 314). The unconstrained binary optimization formulation may be one of a quadratic unconstrained binary optimization (QUBO) formulation, a QUBO formulation with a set of equality constraints, or a QUBO formulation with a set of inequality constraints. The QUBO formulation may be a compatible input formulation for the first optimization solver machine 106 (which includes a QUBO solver) to generate a solution of the integrated clustering and outlier detection problem.

The QUBO formulation may include a square matrix of constants and a vector of binary decision variables that may correspond to the received set of datapoints 112. The QUBO formulation may also include constraints associated with the objective function of the integrated clustering and outlier detection. By way of example, and not limitation, a generalized QUBO formulation for any problem may be given by equation (2), as follows:

$$\min(y = x^T \cdot Q \cdot x) \quad (2)$$

where x is the vector of binary decision variables and Q is a square matrix of constants. In another form, the QUBO formulation (unconstrained binary optimization formulation) may be given by equation (3), as follows:

$$f(q_1, q_2, \ldots, q_n) = \sum_{i=0}^{n} b_i q_i + \sum_{1 \leq i \leq j \leq n} w_{ij} q_i q_j \quad (3)$$

where,
$b_i$'s and $w_{ij}$'s are constants that defines the problem,
$q_1, q_2, q_3, q_n \in \{0,1\}$ are the binary decision variables. and i and j are the indices of the binary decision variables, and n is the number of binary decision variables.

In some embodiments, before the objective function is transformed into the unconstrained binary optimization formulation, the formulated objective function may be transformed first into an initial unconstrained binary optimization formulation without any penalty term. A penalty term may be appended to convert the initial unconstrained binary optimization formulation into the unconstrained binary optimization formulation. The penalty term may be appended to allow the first optimization solver machine 106 to avoid choosing an infeasible solution that may violate the constraint associated with the formulated objective function. Specifically, the penalty term may be appended such that the penalties may equal zero for feasible solutions and may equal a positive value for infeasible solutions of the discrete solution space. The penalty term may be selected by considering that positive values of the penalty term for the infeasible solutions may remain high enough to determine such solutions as infeasible.

The objective function of equation (1) may be transformed using equation (3) into a QUBO formulation of equation (4) for the integrated clustering and outlier detection, which is given as follows:

$$E = \sum_{i<j} d(x_i, x_j) \sum_{k=1}^{K} q_k^i q_k^j + \sum_{i=1}^{n} w \left( \sum_{a=1}^{K} \sum_{b=1}^{K} q_a^i q_b^i \right) + \overline{w} \left( \sum_{i=1}^{n} \sum_{k=1}^{K} q_k^i - Q \right)^2 \quad (4)$$

where, $x_1, \ldots, x_n$ are n datapoints in set of datapoints (received at 302), K is the maximum number of datapoint clusters (as specified in the third input at 308), L is the number of outlier datapoints (as specified in the first input at 304), $d(x_i, x_j)$ represents a dissimilarity measure between datapoint $x_i$ and point $x_j$ (as computed at 314).

w, $\overline{w}$ represents penalty terms (chosen heuristically) for violating constraints. Larger values of the penalty terms may mean that there is a higher chance of constraints being satisfied and the expanse of lower quality result, Q may be equal to total number of datapoints (n−L) in the K disjoint clusters, For positive integers $i \in [1, n]$ and $k \in [1, K]$, and $q_k^i$ is the binary decision variable that denotes point $x_i$ is assigned to a cluster k.

The QUBO formulation, as given by equation (4), may be an energy function that may be minimized by the first optimization solver machine 106. The QUBO formulation may be generated based on the objective function and the associated constraints of equation (1). The QUBO formulation may also include the penalty terms that may be chosen heuristically to obtain the global minimum energy, and not the local minimum energy, of the QUBO formulation.

At 318, the unconstrained binary optimization formulation may be provided as a first input to the first optimization solver machine 106. The first optimization solver machine 106 may include a QUBO solver that may be configured to generate a solution of the unconstrained binary optimization formulation. The solution of the first optimization solver machine 106 may include a value for each binary decision variable in the vector of binary variables.

In some embodiments, the unconstrained binary optimization formulation may be converted into a particular format before being submitted to the first optimization solver machine 106. By way of example, and not limitation, before submitting to the first optimization solver machine 106, the unconstrained binary optimization formulation may be converted into an Algebraic Modelling Language (AML) format. The AML format may correspond to a format that describes the transformed unconstrained binary optimization formulation as a code of a high-level computer programming language. The code may be used by the first optimization solver machine 106 to generate the solution of the unconstrained binary optimization formulation for the integrated clustering and outlier detection. As an example, the AML format may be a Python-based open-source Optimization Modeling Language (PYOMO) format, A-Mathematical Programming Language (AMPL), and the like. The AML format of the transformed unconstrained binary optimization formulation may not be directly executed, but instead may be used by the first optimization solver machine 106 (or other external optimization solver machines) to compute the solution.

The AML format of the unconstrained binary optimization formulation may be submitted to the first optimization solver machine 106. In one or more embodiments, the processor 202 may submit the AML format of the unconstrained binary optimization formulation to the first optimization solver machine 106. In an embodiment, the AML format of the unconstrained binary optimization formulation may be submitted to the first optimization solver machine 106 via an API request. For example, a call (e.g., an API call) may be provided to the first optimization solver machine 106 to generate a solution to the unconstrained binary optimization formulation as a first output of the first optimization solver machine 106.

The first optimization solver machine 106 may apply searching methods and/or meta-heuristic methods, such as quantum annealing, to search for the solution (i.e. values of the vector of binary decision variables (q) of the equation (4)) that minimizes the energy (E of equation (4)) of the unconstrained binary optimization formulation. The solution may be optimal (or near optimal) and may be selected from a discrete solution space (for the equation (4), for example).

In an exemplary embodiment, the first optimization solver machine 106 may be a digital annealer (e.g. a CMOS annealer), a quantum annealing device, or a generalized quantum computing device that may be able to solve the QUBO formulation for the integrated clustering and outlier detection. The first optimization solver machine 106 may apply a quantum annealing method to search for the solution to the unconstrained binary optimization formulation by finding a global minimum (lowest energy (E) of equation (4)) of the QUBO formulation. As an example, from equation (1) and equation (4), the first optimization solver machine 106 may retrieve the Q-matrix (i.e. the matrix that represents the clustering and outlier detection problem) and search for values of the vector (q) of binary decision variables for which the energy (E) of the equation (4) is minimized.

At 320, a first clustering and a first outlier detection result may be generated. The first clustering result and the first outlier detection result may be generated based on the first output of the first optimization solver machine 106. The first clustering result may include a plurality of datapoint clusters (i.e. disjoint clusters), where each cluster of the plurality of datapoint clusters may include a subset of datapoints of the received set of datapoints 112. The first outlier detection result may include a set of outlier datapoints. Each outlier datapoint may correspond to a datapoint of the received set of datapoints 112 that may be excluded from the first clustering result.

The first output of the first optimization solver machine 106 may include binary values for a first set of binary decision variables of the unconstrained binary optimization formulation. The first set of binary decision variables may correspond to an encoding of the received set of datapoints 112 in the unconstrained binary optimization formulation. Specifically, for each datapoint of the received set of datapoints 112, there may be an associated decision variable that may indicate whether the datapoint is a part of a datapoint cluster or not. The decision variables may be associated in such a way that a single datapoint may not be a part of more than one datapoint clusters. By way of example and not limitation, if value of a decision variable associated with a first datapoint is "1" for a first cluster, the processor 202 may assign the first datapoint to the first cluster. Similarly, if the decision variable associated with a first datapoint is "0" for a first cluster, the processor 202 may not assign the first datapoint to the first cluster, but instead to another cluster for which the decision variable associated with the first datapoint is 1. The datapoints for which the decision variable is "0" for all the clusters may be assigned as datapoint outliers.

At 322, it may be determined whether the generated first clustering and the first outlier detection result satisfy a set of validity constraints. The set of validity constraints may include a first validity constraint which may mandate that every datapoint in the received set of datapoints 112 (at 302) belongs to (is mapped to) at most one datapoint cluster of the plurality of datapoint clusters in the first clustering result. The first validity constraint may ensure that the no datapoint is erroneously assigned to two disjoint clusters in the first clustering result. Similarly, the set of validity constraints may include a second validity constraint which may mandate that the number of outlier datapoints (represented as L in equation (4)) in the first outlier detection result should match the number of outlier datapoints (as specified in the first input at 304). In cases where the generated first clustering result and the first outlier detection result fail to satisfy the set of validity constraints; control may pass to 324. Otherwise, control may pass to 332.

At 324, it may be determined whether the first validity constraint is violated. In cases where the first validity constraint is violated, control may pass to 326. Otherwise, control may pass to 328.

At 326, a first penalty term of the QUBO formulation may be modified. For example, the first penalty term (w) of equation (4) may be incremented by a defined value and the QUBO formulation of equation (4) may be updated. The updated QUBO formulation may be submitted again to the first optimization solver machine 106 (as performed at 318). The results for the submitted QUBO formulation may be again checked against the set of validity constraint (as performed at 322). Abovementioned operations may be repeated till the results satisfy the set of validity constraints.

At 328, it may be determined whether the second validity constraint is violated. In cases where the second validity constraint is violated, control may pass to 330. Otherwise, control may pass to 332.

At 330, a second penalty term of the QUBO formulation may be modified. For example, the second penalty term ($\overline{w}$) of equation (4) may be incremented by a defined value and the QUBO formulation of equation (4) may be updated. The updated QUBO formulation may be submitted again to the first optimization solver machine 106 (as performed at 318). The results for the submitted QUBO formulation may be again checked against the set of validity constraint (as performed at 322). Abovementioned operations may be repeated till the results satisfy the set of validity constraints.

At 332, the first clustering result and the first outlier detection result may be published on the publisher system 104. As one example, the first clustering result and the first outlier detection result may be displayed on a display screen associated with the publisher system 104. In one or more embodiments, the processor 202 may publish the first clustering result and the first outlier detection result on a user-end terminal of the publisher system 104. In another embodiment, the first clustering result and the first outlier detection result may be updated in a database that may be stored in the publisher system 104.

Although the flowchart 300 is illustrated as discrete operations, such as 302, 304, 306, 308, 310, 312, 314, 316, 318, 320, 322, 324, 326, 328, 330, and 332. However, in certain embodiments, such discrete operations may be further divided into additional operations, combined into fewer operations, or eliminated, depending on the particular implementation without detracting from the essence of the disclosed embodiments.

Figure 4:
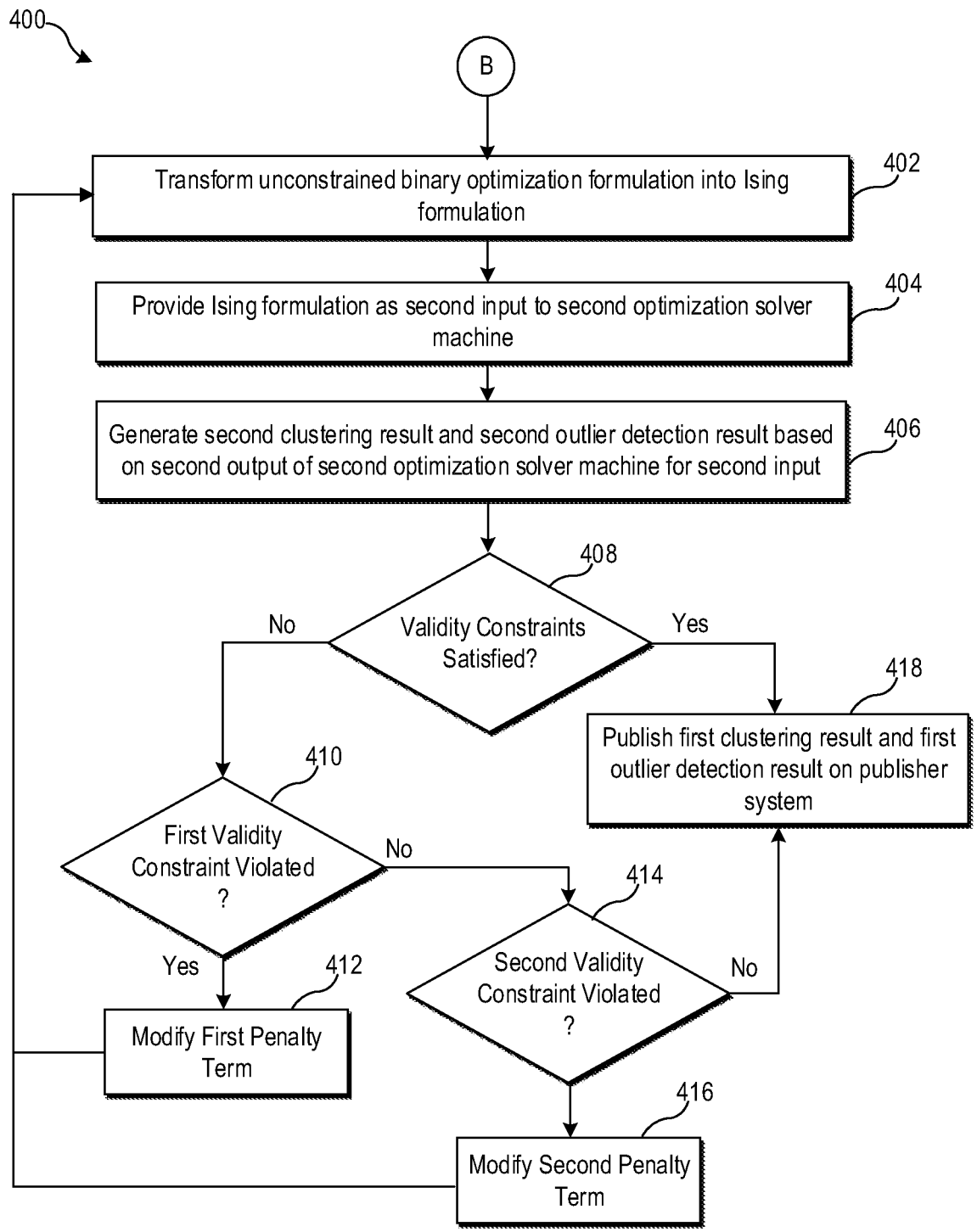
FIG. 4 is a flowchart of an example method of solving the integrated clustering and outlier detection problem of FIGS. 3A-B using a second optimization solver machine.

FIG. 4 is a flowchart of an example method of solving the integrated clustering and outlier detection problem of FIGS. 3A-B using a second optimization solver machine, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the system 102 of FIG. 1, or FIG. 2.

At 402, the unconstrained binary optimization formulation (from 316) may be transformed into an Ising formulation. The Ising formulation may be a compatible input format for the set of Ising processing units 108a of the second optimization solver machine 108. The set of Ising processing units 108a may be configured to solve the Ising formulation of the formulated objective function (obtained at 310).

By way of example, and not limitation, the unconstrained binary optimization formulation may be transformed to the Ising formulation by replacing $x_i$ in in the unconstrained binary optimization formulation of equation (3) by $[(1+z_i)/2]$. A generalized equation of the Ising formulation is given by equation (5), as follows:

$$f(z_1, z_2, z_3, \ldots z_n) = \sum_{i=0}^{n} b'_i z_i + \sum_{1 \leq i \leq j \leq n} w'_{ij} z_i z_j \quad (5)$$

where,
$b_i$'s and $w'_{ij}$'s are constants that defines the problem, and $z_1, z_2, z_3, \ldots, z_n \in (-1,1)$ are the decision variables.

In the Ising formulation, attributes and relationship among the attributes are based on an Ising model. The Ising model is a mathematical model of ferromagnetism in reference to statistical mechanics. The model uses discrete variables which represent the magnetic dipole moments of spin states, (which are either +1 or −1). The datapoints (which are represented as the spin states) may be organized as a lattice so each spin may interact with its neighbors. The energy of the Ising formulation may be minimized to generate an optimal or near optimal solution for the integrated clustering and outlier detection problem.

The solution of the Ising formulation may be differ from that of the QUBO formulation with respect to selection of values for the decision variables. For the unconstrained binary optimization formulation (as given in equation (4) as referenced with FIGS. 3A-B), the binary value for a decision variable (q) for may be represented as one of 0 or 1.

Whereas, for the Ising formulation, the binary value for a decision variable may be represented as one of −1 or +1 (which may be analogous to two spin states of an Ising system).

At 404, the Ising formulation may be provided as a second input to the second optimization solver machine 108 to generate the solution for the integrated clustering and outlier detection task by solving the Ising formulation. In one or more embodiments, the processor 202 may provide the Ising formulation to the second optimization solver machine 108.

By way of example and not limitation, the Ising formulation may be submitted to the second optimization solver machine 108 via an API request. For example, a call (e.g., API call) may be provided to the second optimization solver machine 108 to generate the solution to the Ising formulation as a second output. The second optimization solver machine 108 may apply searching methods and/or meta-heuristic methods, such as quantum annealing, to search for the solution to the Ising formulation from a discrete solution space by finding a global minimum (i.e. analogous to a minimum energy state of an Ising system) of the Ising formulation.

In an exemplary embodiment, the second optimization solver machine 108 may be a digital annealer, a quantum annealing device or a generalized quantum computing device that may be able to solve the Ising formulations. The second optimization solver machine 108 may apply a quantum annealing method to generate a solution for the submitted Ising formulation by searching for a global minimum of the Ising formulation. The second output of the second optimization solver machine 108 may include binary values of a second set of binary decision variables of the Ising formulation. The second set of binary decision variables may correspond to an encoding of the received set of datapoints 112 in the Ising formulation.

At 406, a second clustering result and a second outlier detection result may be generated. The second clustering result and the second outlier detection result may be generated based on the second output of the second optimization solver machine 108 for the submitted Ising formulation. The second clustering result may include a second plurality of datapoint clusters, where each cluster may include a second subset of datapoints of the received set of datapoints 112. Similarly, the second outlier detection result may include a second set of outlier datapoints, where each outlier datapoint may correspond to a datapoint of the received set of datapoints 112 that may be excluded from the second clustering result.

Datapoints from the set of datapoints 112 may be assigned to each datapoint cluster based on values of respective decision variables associated with the datapoints. By way of example and not limitation, for each datapoint of the received set of datapoints 112, there may be an associated decision variable that may indicate whether the datapoint should be assigned to a particular cluster or not. If the decision variable associated with a first datapoint is +1 for a first cluster, then the first datapoint may be assigned to the first cluster. Otherwise, if the decision variable associated with the first datapoint is −1 for the first cluster, the second datapoint may not be assigned to the first cluster, but instead to another cluster for which the value of the decision variable is +1. The datapoints for which the decision variable is −1 for all the clusters may be detected (or assigned) as the datapoint outliers and may be included in the second clustering result.

At 408, it may be determined whether the generated first clustering and the first outlier detection result satisfy a set of validity constraints. The set of validity constraints may include a first validity constraint which may mandate that every datapoint in the received set of datapoints 112 (at 302) belongs to (is mapped to) at most one datapoint cluster of the plurality of datapoint clusters in the first clustering result. The first validity constraint may ensure that the no datapoint is erroneously assigned to two disjoint clusters in the first clustering result. Similarly, the set of validity constraints may include a second validity constraint which may mandate that the number of outlier datapoints (represented as L in equation (4)) in the first outlier detection result should match the number of outlier datapoints (as specified in the first input at 304). In cases where the generated first clustering result and the first outlier detection result fail to satisfy the set of validity constraints; control may pass to 410. Otherwise, control may pass to 418.

At 410, it may be determined whether the first validity constraint is violated. In cases where the first validity constraint is violated, control may pass to 412. Otherwise, control may pass to 414.

At 412, a first penalty term of the QUBO formulation may be modified. For example, the first penalty term (w) of equation (4) may be incremented by a defined value and the QUBO formulation of equation (4) may be updated. The updated QUBO formulation may be transformed to an updated Ising formulation and submitted again to the second optimization solver machine 108 (as performed at 404). The results for the submitted Ising formulation may be again checked against the set of validity constraint (as performed at 408). Abovementioned operations may be repeated till the results satisfy the set of validity constraints.

At 414, it may be determined whether the second validity constraint is violated. In cases where the second validity constraint is violated, control may pass to 416. Otherwise, control may pass to 418.

At 416, a second penalty term of the QUBO formulation may be modified. For example, the second penalty term ($\bar{w}$) of equation (4) may be incremented by a defined value and the QUBO formulation of equation (4) may be updated. The updated QUBO formulation may be transformed to an updated Ising formulation and submitted again to the second optimization solver machine 108 (as performed at 404). The results for the submitted Ising formulation may be again checked against the set of validity constraint (as performed at 408). Abovementioned operations may be repeated till the results satisfy the set of validity constraints.

At 418, the second clustering result and the second outlier detection result may be published on the publisher system 104. In an embodiment, the second clustering result and the second outlier detection result may be displayed on the display screen associated with the publisher system 104. In another embodiment, the second clustering result and the second outlier detection result may be updated on a database that may be stored on the publisher system 104.

Although the flowchart 400 is illustrated as discrete operations, such as 402, 404, 406, 408, 410, 412, 414, 416, and 418. However, in certain embodiments, such discrete operations may be further divided into additional operations, combined into fewer operations, or eliminated, depending on the particular implementation without detracting from the essence of the disclosed embodiments.

Figure 5:
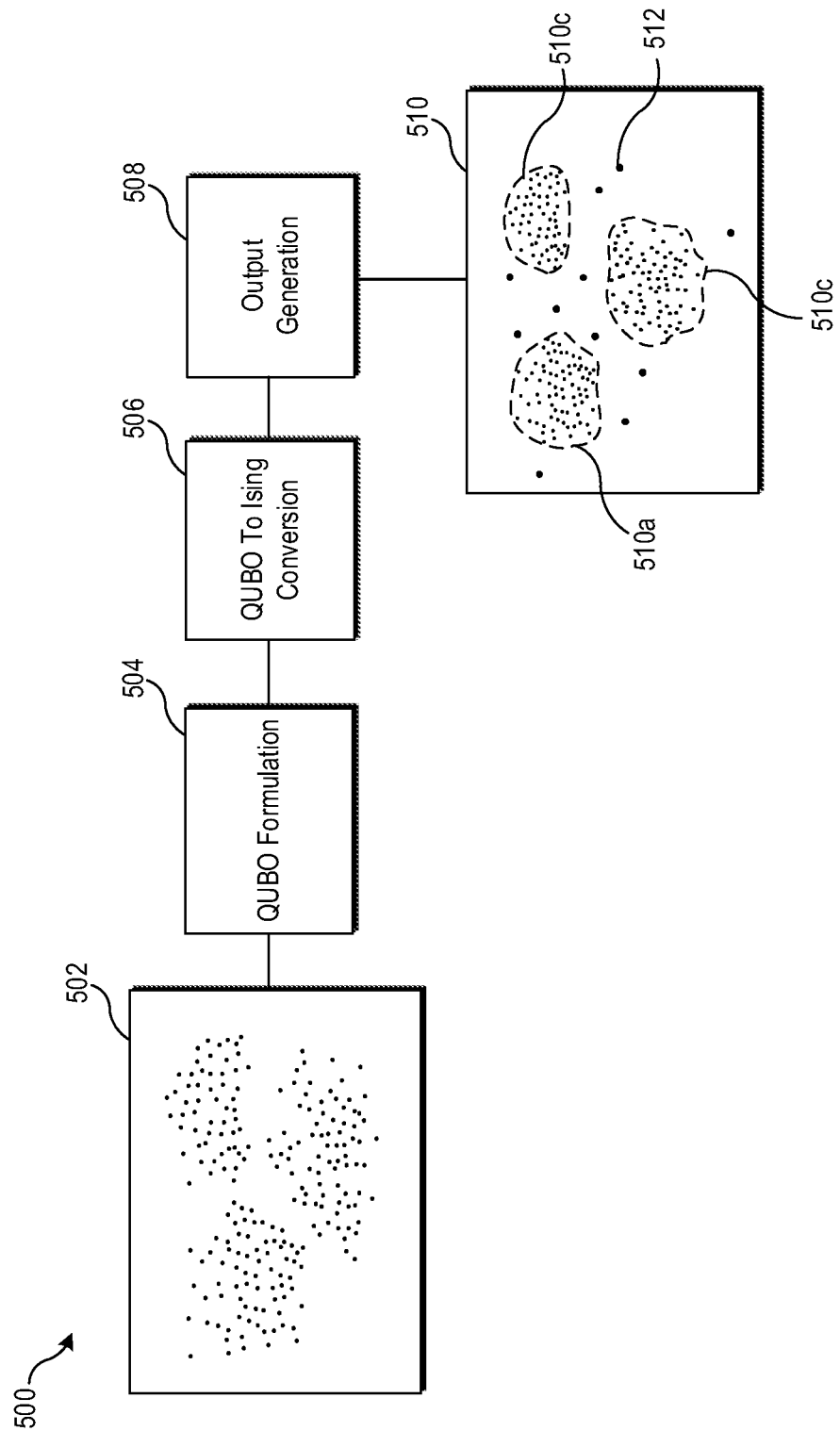
FIG. 5 is a diagram that depicts an example scenario for integrated clustering and outlier detection using an optimization solver machine, all according to at least one embodiment described in the present disclosure.

FIG. 5 is a diagram that depicts an example scenario for integrated clustering and outlier detection using an optimization solver machine, in accordance with at least one embodiment of the disclosure. FIG. 5 is explained in conjunction with elements from FIG. 1, FIG. 2, FIG. 3, and FIG. 4. With reference to FIG. 5, there is shown a block diagram 500 of an example scenario for an integrated clustering and outlier detection. There is further shown a set of datapoints 502 associated with a user of a social media platform. Each datapoint may correspond to a friend in a friend list of the user. Additionally, each datapoint of the set of datapoints 502 may include information about a particular friend in the friend list. For example, such information may include the friend's name, friend's school, friend's college name, and friend's workplace. An example of such information is provided in Table 1, as follows:

TABLE 1

Information about Friend of the user on social media platform

| Name of Friend | Name of School | Name of College | Name of Workplace |
| --- | --- | --- | --- |
| Friend 1 | School 1 | College 1 | Workplace 1 |
| Friend 2 | School 2 | College 2 | Workplace 2 |
| Friend 3 | School 1 | College 3 | Workplace 3 |
| Friend 4 | School 4 | College 4 | Workplace 4 |
| Friend 5 | School 5 | College 5 | Workplace 2 |
| Friend 6 | School 6 | College 6 | Workplace 5 |
| Friend N | School N | College 1 | Workplace N |
| ... | ... | ... | ... |

Information shown in Table. 1 is presented merely as an example and should not be construed as limiting for the disclosure. In one or more embodiments, the information in Table 1 may include more or less than 4 features the friends of the user, without a deviation from the scope of the disclosure.

The system 102 may receive a first input and a second input from a user associated with the system 102. The user may be same as or different from the user of the social media platform. The first input may correspond to a number of friends to be detected as outlier(s) from the set of datapoints 502. The second input may correspond to a distance metric (such as Euclidean distance) to be used to determine dissimilarity between any pair of datapoints in the set of datapoints 502. Additionally, the system 102 may receive a third input which may specify a maximum number of datapoint clusters to be formed from the set of datapoints 502. For example, the second input may specify the number of clusters to be three (3), i.e. to cluster the set of datapoints 502 into a first cluster of friends that share a common school, a second cluster of friends that share a common college, and a third cluster of friends that share a common workplace. Based on the inputs (the first input, the second input, or the third input), the system 102 may formulate an objective function for an integrated clustering and outlier detection from the received set of datapoints 502.

At 504, the system 102 may generate a QUBO formulation based on the formulated objective function. The QUBO formulation may be a compatible input format for a QUBO solver on the first optimization solver machine 106. An example of a QUBO formulation for the integrated clustering and outlier detection is provided in equation (4) as referenced in FIGS. 3A-B.

At 506, the QUBO formulation may be transformed to an Ising formulation. The Ising formulation may be a compatible input format for the set of Ising processing units 108a on the second optimization solver machine 108. The conversion of the QUBO formulation to the Ising formulation is described in detail in FIG. 4.

The system 102 may provide the QUBO formulation (or the Ising formulation) as input to the first optimization solver machine 106 (or the second optimization solver machine 108). The output of the first optimization solver machine 106 (or the second optimization solver machine 108) may be binary values of binary decision variables of the QUBO formulation (or the Ising formulation). The binary decision variables may correspond to an encoding of the set of datapoints 512.

At 508, the system 102 may generate a clustering result and an outlier detection result based on the output of the first optimization solver machine 106 (and/or the second optimization solver machine 108). The clustering result may include a plurality of datapoint clusters and a set of outlier datapoints. The plurality of datapoint clusters may include a school cluster 510a, a college cluster 510b and a workplace cluster 510c. For example, with reference to Table 1, the school cluster 510a may include datapoints corresponding to Friend 1 and Friend 3 as they have studied in same school. The college cluster 510b may include datapoints corresponding to Friend 4 and Friend N as they have studied in same college. Similarly, the workplace cluster 510c may include datapoints corresponding to Friend 2 and Friend 5 as they work in the same workspace.

The outlier detection result may include a set of outlier datapoints, such as a datapoint 512 corresponding to Friend 6 who may not have a common school, college, or workplace with any other friends in the friend list. The system 102 may publish the clustering result and the outlier detection result on a GUI of the publisher system 104.

Various embodiments of the disclosure may provide a non-transitory computer-readable storage medium configured to store instructions that, in response to being executed, causes a system (such as the system 102) to perform operations. The operations may include receiving a set of datapoints (such as the set of datapoints 112) for integrated clustering and outlier detection. The operations may further include receiving, as a first input, a first clustering constraint including a number of outlier datapoints to be detected from the received set of datapoints 112. The operations may further include receiving a second input that may include distance metric. The operations may further include formulating an objective function for the integrated clustering and outlier detection based on the received first input and the second input. The operations may further include transforming the formulated objective function into an unconstrained binary optimization formulation. The operations may further include providing the unconstrained binary optimization formulation as a first input to a first optimization solver machine (such as the first optimization solver machine 106). The operations may further include generating a first clustering result based on a first output of the first optimization solver machine for the first input. The first clustering result may include a plurality of datapoint clusters and a first outlier detection result including a set of outlier datapoints. The operations may further include publishing the first clustering result and the first outlier detection result on a publisher system (such as the publisher system 104).

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   receiving a set of datapoints for an integrated clustering and outlier detection;
   receiving, as a first input, a first clustering constraint comprising a number of outlier datapoints to be detected from the received set of datapoints;
   receiving a second input comprising a distance metric;
   formulating an objective function for the integrated clustering and outlier detection based on the received first input and the second input;
   transforming the formulated objective function into an unconstrained binary optimization formulation;
   providing the unconstrained binary optimization formulation as a first input to a first optimization solver machine;
   generating a first clustering result comprising a plurality of datapoint clusters and a first outlier detection result comprising a set of outlier datapoints, based on a first output of the first optimization solver machine for the first input; and
   publishing the first clustering result and the first outlier detection result on a publisher system.

2. The method according to claim 1, further comprising receiving, as a third input, a second clustering constraint comprising a maximum number of datapoint clusters to be included in the first clustering result.

3. The method according to claim 2, wherein the objective function is formulated further based on the third input.

4. The method according to claim 1, wherein the distance metric is one of Euclidean distance, L1 norm, Minkowski distance, Manhattan distance, L2 norm, or cosine distance.

5. The method according to claim 1, further comprising:
   selecting a pair of datapoints from the received set of datapoints; and
   computing a value of the distance metric between a first datapoint of the selected pair of datapoints and a second datapoint of the selected pair of datapoints.

6. The method according to claim 5, the transforming of the formulated objective function into the unconstrained binary optimization formulation is based on the computed value of the distance metric.

7. The method according to claim 1, wherein the unconstrained binary optimization formulation comprises a relationship between a vector of binary decision variables and a square matrix corresponding to the formulated objective function.

8. The method according to claim 1, wherein
   each cluster of the plurality of datapoint clusters comprises a subset of datapoints of the received set of datapoints, and
   each outlier datapoint of the set of outlier datapoints corresponds to a datapoint of the received set of datapoints that is excluded from the first clustering result.

9. The method according to claim 1, wherein the unconstrained binary optimization formulation is one of a Quadratic Unconstrained Binary Optimization (QUBO) function, a first Quadratic Binary Optimization function with a set of equality constraints, or a second Quadratic Binary Optimization function with a set of inequality constraints.

10. The method according to claim 1, wherein the first optimization solver machine comprises a quadratic unconstrained binary optimization (QUBO) solver.

11. The method according to claim 1, further comprising:
    submitting the unconstrained binary optimization formulation in an Algebraic Modelling Language (AML) format to the first optimization solver machine; and
    providing a call to the first optimization solver machine to generate the first output as a solution to the unconstrained binary optimization formulation, wherein
    the generated first output comprises binary values for a first set of binary decision variables of the unconstrained binary optimization formulation, and the first set of binary decision variables corresponds to an encoding of the received set of datapoints in the unconstrained binary optimization formulation.

12. The method according to claim 1, further comprising:
transforming the unconstrained binary optimization formulation into an Ising formulation;
providing the Ising formulation as a second input to a second optimization solver machine; and
generating, as a second output of the second optimization solver machine for the second input, a second clustering result comprising the plurality of datapoint clusters and a second outlier detection result comprising the set of outlier datapoints.

13. The method according to claim 12, wherein
the second optimization solver machine comprises a set of Ising Processing Units (IPUs) that is configured to solve the Ising formulation to generate the second output,
the generated second output comprises binary values of a set of second binary decision variables of the Ising formulation, and
the set of second binary decision variables corresponds to an encoding of the received set of datapoints in the Ising formulation.

14. The method according to claim 1, further comprising:
transforming the objective function into an initial unconstrained binary optimization formulation; and
obtaining the unconstrained binary optimization formulation by appending a penalty term to the initial unconstrained binary optimization formulation,
wherein the appending is based on a set of penalty conditions associated with the integrated clustering and outlier detection.

15. A non-transitory computer-readable storage medium configured to store instructions that, in response to being executed, causes a system to perform operations, the operations comprising:
receiving a set of datapoints for an integrated clustering and outlier detection;
receiving, as a first input, a first clustering constraint comprising a number of outlier datapoints to be detected from the received set of datapoints;
receiving a second input comprising a distance metric;
formulating an objective function for the integrated clustering and outlier detection based on the received first input and the second input;
transforming the formulated objective function into an unconstrained binary optimization formulation;
providing the unconstrained binary optimization formulation as a first input to a first optimization solver machine;
generating a first clustering result comprising a plurality of datapoint clusters and a first outlier detection result comprising a set of outlier datapoints, based on a first output of the first optimization solver machine for the first input; and
publishing the first clustering result and the first outlier detection result on a publisher system.

16. The non-transitory computer-readable storage medium according to claim 15, wherein the operations further comprises receiving, as a third input, a second clustering constraint comprising a maximum number of datapoint clusters to be included in the first clustering result.

17. The non-transitory computer-readable storage medium according to claim 16, wherein the objective function is formulated further based on the third input.

18. The non-transitory computer-readable storage medium according to claim 15, wherein the operations further comprises:
transforming the unconstrained binary optimization formulation into an Ising formulation;
providing the Ising formulation as a second input to a second optimization solver machine; and
generating, as a second output of the second optimization solver machine for the second input, a second clustering result comprising the plurality of datapoint clusters and a second outlier detection result comprising the set of outlier datapoints.

19. The non-transitory computer-readable storage medium according to claim 18, wherein
the second optimization solver machine comprises a set of Ising Processing Units (IPUs) that is configured to solve the Ising formulation to generate the second output,
the generated second output comprises binary values of a set of second binary decision variables of the Ising formulation, and
the set of second binary decision variables corresponds to an encoding of the received set of datapoints in the Ising formulation.

20. A system, comprising:
a processor communicatively coupled to a first optimization solver machine and a publisher system, wherein the processor is configured to:
receive a set of datapoints for an integrated clustering and outlier detection;
receive, as a first input, a first clustering constraint comprising a number of outlier datapoints to be detected from the received set of datapoints;
receive a second input comprising a distance metric;
formulate an objective function for the integrated clustering and outlier detection based on the received first input and the second input;
transform the formulated objective function into an unconstrained binary optimization formulation;
provide the unconstrained binary optimization formulation as a first input to the first optimization solver machine;
generate a first clustering result comprising a plurality of datapoint clusters and a first outlier detection result comprising a set of outlier datapoints, based on a first output of the first optimization solver machine for the first input; and
publish the first clustering result and the first outlier detection result on the publisher system.

* * * * *